United States Patent Office 3,823,078
Patented July 9, 1974

3,823,078
PRODUCTION OF FLUIDIZED ALUMINA
REDUCTION CELL FEED
Leland Stanford Beeler, Richmond, Va., assignor to
Reynolds International, Inc., Richmond, Va.
No Drawing. Filed Dec. 14, 1972, Ser. No. 315,275
Int. Cl. C01b 7/22; C22d 3/12
U.S. Cl. 204—67
3 Claims

ABSTRACT OF THE DISCLOSURE

A fluoridated calcined alumina suitable for use as aluminum reduction cell feed is prepared by calcining alumina hydrate, especially Bayer process alumina hydrate, and introducing a source of fluorine such as HF, which may also be derived from cell waste gases, so as to achieve a fluorine content in the calcined alumina between about 1% and 3.5% by weight.

BACKGROUND OF THE INVENTION

The present invention relates to a method of preparing fluoridated calcined alumina suitable for use as an aluminum reduction cell feed. The practice of the invention will be illustrated with respect to the treatment of alumina hydrate obtained by the Bayer process, but it is not to be considered as limited thereto.

In the processing of aluminous ores, and particularly ores of the bauxite type, in which the aluminum occurs largely as hydrated oxides, the method used for the extracting the alumina is the Bayer process. In accordance with this process, the ground bauxite is digested with an aqueous solution of an alkali, such as, for example, caustic soda, or with a mixture of caustic soda and sodium carbonate. There is obtained a slurry which comprises a suspension of the constituents of the bauxite other than alumina and which are insoluble in the alkali liquor. The liquor contains the alumina dissolved in the form of a super-saturated solution of sodium aluminate. The constituents of the bauxite which remain unattacked during the alkali digestion form an insoluble residue known as red mud. For recovery of the alumina, the sodium aluminate solution or Bayer liquor is separated from the red mud by filtration or sedimentation or a combination of both. The clarified liquor comprises an unstable solution of alumina from which most of the dissolved alumina is precipitated by seeding with alumina hydrate. The precipitated alumina hydrate is then separated from the liquor by sedimentation and filtration, washed and calcined at high temperatures to form alumina suitable for reduction cell feed.

Aluminum metal is conventionally produced in electrolytic reduction cells by passing an electric current through a bath of molten cryolite containing dissolved alumina and various additives such as fluorspar, magnesium fluoride, and the like. In natural cryolite ($Na_3AlF_6$) the weight ratio of NaF to $AlF_3$ is close to 1.5 to 1, although in synthetic cryolites such as those produced by wet process systems, the NaF/$AlF_3$ ratio is considerably higher. The carbon lining of the reduction cell and the pool of molten metallic aluminum overlying it when the cell is in operation constitute the cathode. A carbon anode extends downward into the cell cavity. During cell operation, the temperature of the molten electrolyte is usually in the vicinity of about 900° to 1000° C., or well above the melting point of aluminum, which is 660° C.

As the cell continues in operation, the molten cryolite electrolyte gradually becomes depleted in fluoride content, by vaporization of components rich in aluminum fluoride. At the same time, components rich in sodium are absorbed into the carbonaceous cathode of the reduction cell. Since it is generally considered desirable to maintain the NaF to $AlF_3$ ratio of the electrolyte within the range of about 1.3:1 to 1.5:1 for optimum cell operation, soda ash may be added to replace the excess sodium collected in the cathode, and alkaline cryolite is advantageously used for this purpose. Thus, during the life of the cell it becomes necessary periodically to add aluminum fluoride and cryolite to offset the vaporization and absorption losses, necessitating the maintenance of inventories of these compounds, and increasing the cost of operation.

In the prior art, it has been customary to manufacture the aluminum fluoride from aluminum hydrate or from alumina by reaction with hydrogen fluoride of high strength, and with the object of attaining as high a degree of fluoridation of the alumina as possible. Usually this operation is performed at a separate location from that at which the alumina is produced, thus necessitating further capital expenditure and incurring extra transportation costs. Accordingly, the aluminum fluoride produced in such separate facilities is high in fluoride (90–95% $AlF_3$) content, and averages from 6 to 8 percent of uncombined alumina. In order to utilize this material as reduction cell feed, it has to be separately stored and handled, and selectively proportioned in relation to a separate source of alumina fed to the cell.

Moreover, in prior art methods of reacting alumina or its hydrate with HF, it is difficult to avoid overheating of the reactor walls, whereby either a paste is formed by the reactants, or fusion takes place, lowering product yield by clogging the apparatus. This drawback of product fusion is not of itself overcome by employing a fluidized bed of the alumina unless special techniques are used, such as fluidizing with an inert gas and raising the bed temperature to a given level before introducing the hydrogen fluoride gas.

During the operation of the alumina reduction cell, as the anode carbon is consumed, conversion of the carbon to carbon dioxide and some carbon monoxide takes place. At the same time, significant amounts of hydrogen fluoride are generated. These gases, together with entrained fine particles of other effluent materials, such as alumina, cryolite, carbon dust, and various metal fluorides, hydrogen, water vapor and tars, comprise the cell effluent or waste gases. These waste gases constitute a potential source of HF for alumina fluoridation, which if carried out at a reduction plant site, offers a means for improving the overall economy of the cell operation.

BRIEF SUMMARY OF THE INVENTION

In accordance with the present invention, an aluminum reduction cell is operated in such manner that the cell feed comprises alumina, such as calcined Bayer process alumina, which has been slightly fluoridated in connection with the calcining operation. By slightly fluoridated is meant that the calcined alumina has picked up between about 1% and about 3.5% of its weight of HF, calculated as fluorine, which appears in the fluoridated product predominantly in the form of aluminum fluoride.

DETAILED DESCRIPTION OF THE INVENTION

As indicated above, a novel feature of the present invention is to effect the formation of a fluoridated alumina as an incident to the customary calcining of alumina hydrate, and prior to completing the final calcination to metallurgical grade alumina suitable for cell feed.

This fluoridation step may be accomplished by injection of anhydrous HF gas directly into the Bayer process rotary kiln, thereby fluoridating the alumina hydrate during calcining. Instead of HF gas, reduction cell effluent gas containing HF may be used for fluoridation purposes.

The cell gas may be diluted with ambient air, and its temperature may be suitably adjusted prior to injection.

The fluoridation treatment includes calcining alumina hydrate to form alumina, having the desired fluorine content, and is usually conducted at temperatures of the order of 1000°–1150° C. This calcination may be performed in the Bayer process rotary kiln, the discharge then being suitable as a fluoridated cell feed alumina.

In accordance with another aspect of the invention, the calcination may be performed in a separate apparatus in which the alumina hydrate is maintained in the form of a fluidized bed. The fluoridation step may also be performed during this type of calcination treatment. In such case, the cell effluent gas, or other source of HF, may also be utilized as a fluidizing agent.

A form of treatment unit suitable for fluidized bed processing includes a hollow tubular shaft having a perforated plate in its lower portion, above which the fluidized bed is maintained, and into which two gas streams are injected. One of these may be anhydrous HF gas, or such other source of HF as cell effluent gas. The other is a stream of heating gas, which should bring the temperature of the alumina hydrate to at least about 360° C. for fluoridation purposes. The alumina hydrate is introduced into the lower portion of the shaft at a point between the two gas inlets. The treated alumina is continuously removed from the bottom of the shaft. A cyclone is provided to recover fines carried off by the gas streams. Additional cyclones can be used for dust removal.

Where the calcination apparatus is, for example, a Lurgi type fluidized calciner, small quantities of HF gas can be injected with the feed or at a stage of intermediate temperature to cause fluoridation of the resulting calcined alumina to the desired level of about 1.5% $AlF_3$ content. Some cryolite can simultaneously be produced by reaction with any soda present with the alumina. Since the concentration of aluminum fluoride is very low, the heat generated by the exothermic fluoridation reaction is not significant to cause any fusion problems. At the same time, the great excess of alumina present results in substantially 100% utilization of the available HF, in whatever form it is presented.

DESCRIPTION OF THE PREFERRED EMBODIMENTS

The following examples serve to illustrate the practice of the invention, but are not to be considered as limiting:

Example 1

Alumina hydrate resulting from the extraction of bauxite by the Bayer process is introduced into a rotary kiln, which is direct fired with gas or fuel oil, and the temperature is brought up to about 1100–1150° C. Anhydrous gas is injected into the kiln at the portion near the feed inlet, advantageously under the bed or in the kiln grate. The HF inflow rate is adjusted to achieve an absorption to about 1.5% $AlF_3$ content. The time of contact is about 15 minutes. The alumina hydrate picks up fluorine as it progresses toward the hot or discharge end of the kiln. Cell effluent gas admixed with ambient air, or other non-contaminating sources of fluorine, may be substituted for the HF gas. The temperature, at the lower end of the kiln is about 1150° C. The discharge material is suitable for reduction cell feed.

Example 2

Alumina hydrate from Bayer processing of bauxite was fed into a fluidized kiln at a rate equivalent to about 25% excess of that stoichiometrically required to achieve an aluminum fluoride content of 1.5% of the alumina. The temperature of the incoming feed was about 130° C. The kiln was maintained with hot fluidizing gas at a temperature of about 1150° C., and HF gas was injected into the fluidized stream at a temperature of about 360° C. The residence time was about 15 minutes. The resulting fluoridated calcined alumina contained about 1.8% $AlF_3$ by weight and was utilized as reduction cell feed.

What is claimed is:

1. In the operation of an aluminum reduction cell, the method of treating effluent gas of the cell which comprises the steps of:
   (a) withdrawing effluent gas containing hydrogen fluoride values given off during cell operation;
   (b) calcining Bayer process alumina hydrate to produce alumina suitable as feed for the cell; and
   (c) in the calcining operation of step (b), heating the alumina hydrate to a temperature of about 1000–1150° C., and, during said heating, introducing the gas obtained in step (a) for reaction with the alumina as it is being calcined.

2. In the operation of an aluminum reduction cell including the steps of feeding calcined alumina into the cell and withdrawing aluminum metal therefrom, the method of preparing fluoridated alumina which comprises calcining alumina hydrate and, prior to completing the final calcination to metallurgical grade alumina suitable for cell feed, introducing a source of hydrogen fluoride effective to achieve a fluorine content in the calcined alumina of between about 1% and about 3.5% by weight.

3. The method of Claim 2 in which the alumina hydrate is Bayer process alumina hydrate.

References Cited

UNITED STATES PATENTS

| | | | |
|---|---|---|---|
| 3,470,075 | 9/1969 | Johnson | 204—67 |
| 3,533,924 | 10/1970 | Ve | 204—67 |
| 3,457,150 | 7/1969 | Vancil et al. | 204—67 |

JOHN H. MACK, Primary Examiner

DONALD R. VALENTINE, Assistant Examiner

U.S. Cl. X.R.

423—483